United States Patent
Kao et al.

(10) Patent No.: US 8,660,209 B2
(45) Date of Patent: Feb. 25, 2014

(54) TRANSMITTER AND FREQUENCY DEVIATION REDUCTION METHOD THEREOF

(75) Inventors: Kai-Peng Kao, Hsinchu (TW);
Chi-Hsueh Wang, Kaohsiung (TW);
Robert Bogdan Staszewski, Delft (NL);
Ping-Ying Wang, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 16 days.

(21) Appl. No.: 13/614,312

(22) Filed: Sep. 13, 2012

(65) Prior Publication Data

US 2013/0188754 A1 Jul. 25, 2013

Related U.S. Application Data

(60) Provisional application No. 61/589,049, filed on Jan. 20, 2012.

(51) Int. Cl.
*H03C 1/52* (2006.01)
*H04L 27/04* (2006.01)

(52) U.S. Cl.
USPC .......................................... 375/300; 455/108

(58) Field of Classification Search
CPC ............. H04L 27/12; H03C 3/06; H03C 5/00
USPC ........... 375/300, 302; 455/108, 110, 113, 119
See application file for complete search history.

(56) References Cited

U.S. PATENT DOCUMENTS

| | | | |
|---|---|---|---|
| 7,675,995 B2 | 3/2010 | Liang et al. | |
| 7,932,763 B2 | 4/2011 | Chen et al. | |
| 2010/0253401 A1* | 10/2010 | Chen et al. | 327/156 |
| 2013/0188749 A1* | 7/2013 | Wang et al. | 375/296 |

OTHER PUBLICATIONS

Zhuang, J., et al.; "A Technique to Reduce Phase-Frequency Modulation Bandwidth in a Polar RF Transmitter;" IEEE Transactions on Circuits and Systems-I: Regular Papers; vol. 57; No. 8; Nov. 2010; pp. 2196-2207.

* cited by examiner

*Primary Examiner* — Lee Nguyen
(74) *Attorney, Agent, or Firm* — McClure, Qualey & Rodack, LLP

(57) ABSTRACT

A transmitter is provided. The transmitter includes a phase/frequency deviation input, a controller and a frequency modulating path. The phase/frequency deviation input receives multiple phase/frequency deviation samples. The controller outputs a modified phase/frequency deviation signal and generates a phase/frequency deviation carry-out signal in response to the phase/frequency deviation samples and a previous time sample of the phase/frequency deviation carry-out signal. The frequency modulating path performs frequency modulation in response to the modified phase/frequency deviation signal and outputs a frequency modulated carrier signal.

49 Claims, 7 Drawing Sheets

TRANSMITTER AND FREQUENCY DEVIATION REDUCTION METHOD THEREOF

This application claims the benefit of U.S. provisional application Ser. No. 61/589,049, filed Jan. 20, 2012, the subject matter of which is incorporated herein by reference.

BACKGROUND

1. Technical Field

The invention relates in general to a transmitter and a frequency deviation reduction method thereof.

2. Background

Referring to FIG. 1, a schematic illustration of a conventional polar transmitter is shown. The conventional polar transmitter 100 includes a polar signal generating and processing circuit 110, an amplitude modulation (AM) unit 120, an all digital phase-locked loop (ADPLL) 130 and a combining unit 140. The polar signal generating and processing circuit 110 generates an amplitude component α and a phase component θ, and processes the phase component θ to obtain a frequency component f. The AM unit 120 performs amplitude modulation on the amplitude component α to obtain an adjusted amplitude component A. The ADPLL 130 includes a frequency modulation (FM) unit 132 and a digital controlled oscillator (DCO) 134. The FM unit 132 and the DCO 134 process the frequency component f to obtain an adjusted frequency component F. The combining unit 140 combines the adjusted amplitude component A and the adjusted frequency component F to generate a transmitted signal RF. To the polar transmitter 100 with wide bandwidth, a peak frequency easily occurs in the frequency component f. In other words, the higher the frequency of the frequency component f, the more complexity of the design of the DCO 134. Besides, DCO 134 with large frequency deviations also suffers nonlinearity problems, thereby degrading the overall performance of the polar transmitter 100.

SUMMARY

The disclosure is directed to a transmitter and a frequency deviation reduction method thereof, limiting a phase variation of an input signal to a specific range to improve the peak frequency phenomenon and reduce the complexity of the phase-locked loop circuit.

According to a first aspect of the present disclosure, a transmitter is provided. The transmitter includes a phase/frequency deviation input, a controller and a frequency modulating path. The phase/frequency deviation input receives multiple phase/frequency deviation samples. The controller outputs a modified phase/frequency deviation signal and generates a phase/frequency deviation carry-out signal in response to the phase/frequency deviation samples and a previous time sample of the phase/frequency deviation carry-out signal. The frequency modulating path performs frequency modulation in response to the modified phase/frequency deviation signal and outputs a frequency modulated carrier signal.

According to a second aspect of the present disclosure, a method of frequency deviation reduction in a transmitter is provided. The method includes the following steps. A phase/frequency deviation input is utilized to receive multiple phase/frequency deviation samples. A controller is utilized to output a modified phase/frequency deviation signal and generate a phase/frequency deviation carry-out signal in response to the phase/frequency deviation samples and a previous time sample of the phase/frequency deviation carry-out signal. A frequency modulating path is utilized to perform frequency modulation in response to the modified phase/frequency deviation signal and output a frequency modulated carrier signal.

According to a third aspect of the present disclosure, a transmitter is provided. The transmitter includes a phase/frequency deviation input, a controller, a frequency modulating path and a phase swapper. The phase/frequency deviation input receives multiple phase/frequency deviation samples. The controller generates an adjusted phase/frequency deviation signal and a phase selection signal according to the phase/frequency deviation samples. The frequency modulating path performs frequency modulation in response to the adjusted phase/frequency deviation signal and outputs a frequency modulated carrier signal consisting of multiple phases. A phase swapper selects one of the phases in response to the phase selection signal for forming the frequency modulated carrier signal.

According to a fourth aspect of the present disclosure, a method of frequency deviation reduction in a transmitter is provided. The method includes the following steps. A phase/frequency deviation input is utilized to receive multiple phase/frequency deviation samples. A controller is utilized to generate an adjusted phase/frequency deviation signal and a phase selection signal according to the phase/frequency deviation samples. A frequency modulating path is utilized to perform frequency modulation in response to the adjusted phase/frequency deviation signal and output a frequency modulated carrier signal consisting of multiple phases. A phase swapper is utilized to select one of the phases in response to the phase selection signal for forming the frequency modulated carrier signal.

According to a fifth aspect of the present disclosure, a transmitter is provided. The transmitter includes a phase/frequency deviation input, a controller, a frequency modulating path and a phase swapper. The phase/frequency deviation input receives multiple phase/frequency deviation samples. The controller generates an adjusted phase/frequency deviation signal and a phase selection signal according to the phase/frequency deviation samples, and outputs a modified phase/frequency deviation signal and generates a phase/frequency deviation carry-out signal in response to multiple adjusted phase/frequency deviation samples of the adjusted phase/frequency deviation signal and a previous time sample of the phase/frequency deviation carry-out signal. The frequency modulating path performs frequency modulation in response to the modified phase/frequency deviation signal and outputs a frequency modulated carrier signal consisting of multiple phases. The phase swapper selects one of the phases in response to the phase selection signal for forming the frequency modulated carrier signal.

According to a sixth aspect of the present disclosure, a method of frequency deviation reduction in a transmitter is provided. The method includes the following steps. A phase/frequency deviation input is utilized to receive multiple phase/frequency deviation samples. A controller is utilized to generate an adjusted phase/frequency deviation signal and a phase selection signal according to the phase/frequency deviation samples, and to output a modified phase/frequency deviation signal and generate a phase/frequency deviation carry-out signal in response to multiple adjusted phase/frequency deviation samples of the adjusted phase/frequency deviation signal and a previous time sample of the phase/frequency deviation carry-out signal. A frequency modulating path is utilized to perform frequency modulation in response to the modified phase/frequency deviation signal and output a frequency modulated carrier signal. A phase swapper is utilized to select one of the phases in response to the phase selection signal for forming the frequency modulated carrier signal.

The invention will become apparent from the following detailed description of the preferred but non-limiting embodiments. The following description is made with reference to the accompanying drawings.

DETAILED DESCRIPTION OF THE INVENTION

The disclosure proposes a transmitter and a frequency deviation reduction method thereof, which limit an effective phase variation of an input signal to a specific range to improve the peak frequency phenomenon and reduce the complexity of the phase-locked loop circuit.

The disclosure proposes a transmitter, which includes a phase/frequency deviation input, a controller and a frequency modulating path. The phase/frequency deviation input receives multiple phase/frequency deviation samples. The controller outputs a modified phase/frequency deviation signal and generates a phase/frequency deviation carry-out signal in response to the phase/frequency deviation samples and a previous time sample of the phase/frequency deviation carry-out signal. The frequency modulating path performs frequency modulation in response to the modified phase/frequency deviation signal and outputs a frequency modulated carrier signal.

The disclosure also proposes a transmitter, which includes a phase/frequency deviation input, a controller, a frequency modulating path and a phase swapper. The phase/frequency deviation input receives multiple phase/frequency deviation samples. The controller generates an adjusted phase/frequency deviation signal and a phase selection signal according to the phase/frequency deviation samples. The frequency modulating path performs frequency modulation in response to the adjusted phase/frequency deviation signal and outputs a frequency modulated carrier signal consisting of multiple phases. A phase swapper selects one of the phases in response to the phase selection signal for forming the frequency modulated carrier signal.

Hereinafter take a transmitter applying the above two technical features as being exemplified, and it is not limited thereto. The above two technical features can be respectively applied to different transmitters without any limitations.

Figure 1:
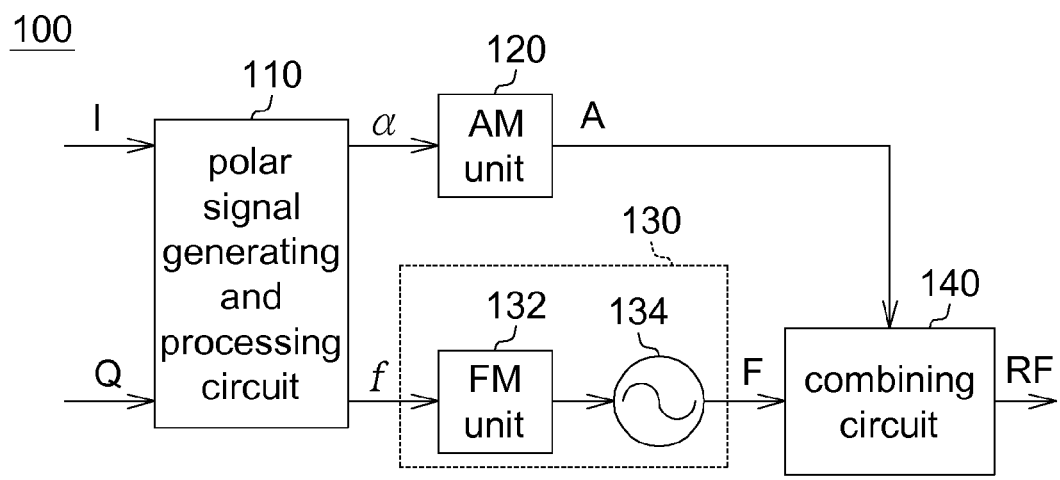
FIG. 1 shows a schematic illustration of a conventional polar transmitter.
Figure 2:
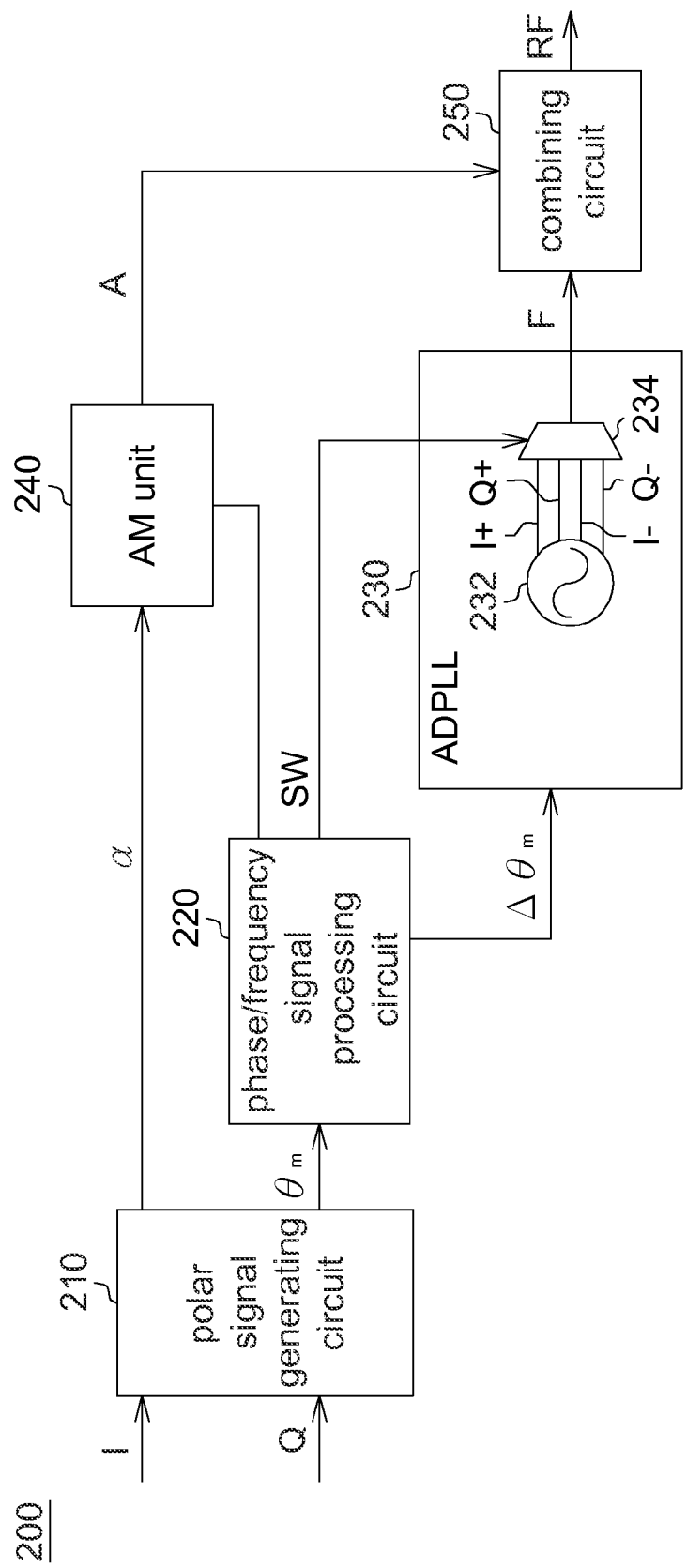
FIG. 2 shows a functional block diagram of a transmitter according to an embodiment.

Referring to FIG. 2, a functional block diagram of a transmitter according to an embodiment is shown. The transmitter 200, such as a polar transmitter, includes a polar signal generating circuit 210, a phase/frequency signal processing circuit 220, an all digital phase-locked loop (ADPLL) 230, an amplitude modulation (AM) unit 240 and a combining circuit 250. The polar signal generating circuit 210 generates an amplitude component α and a phase component $\theta_m$ according to I channel baseband signal and Q channel baseband signal. The phase/frequency signal processing circuit 220 processes the phase component $\theta_m$ to obtain a modified phase/frequency deviation signal $\Delta\theta_m$ and a phase selection signal SW. The ADPLL 230 includes a digital controlled oscillator (DCO) 232 and a phase swapper 234. For example, when only the first said technical feature is applied to the transmitter 200, the phase swapper 234 is optional and can be omitted. The DCO 230 obtains a frequency modulated carrier signal F. The AM unit 240 performs amplitude modulation on the amplitude component a to obtain an adjusted amplitude component A. The samples of the AM component on the AM path are substantially inversely correlated the samples of the phase component on the FM path. Therefore, the samples on the FM path are inspected as being exemplified in the following embodiments, and it can be replaced by inspecting the samples on the AM path. The combining circuit 250 combines the adjusted amplitude component A and the frequency modulated carrier signal F to generate a transmitted signal RF. The combining circuit 250 could be implemented by a digitally-controlled power amplifier or radio frequency digital-to-analog converter (RF-DAC).

Figure 3:
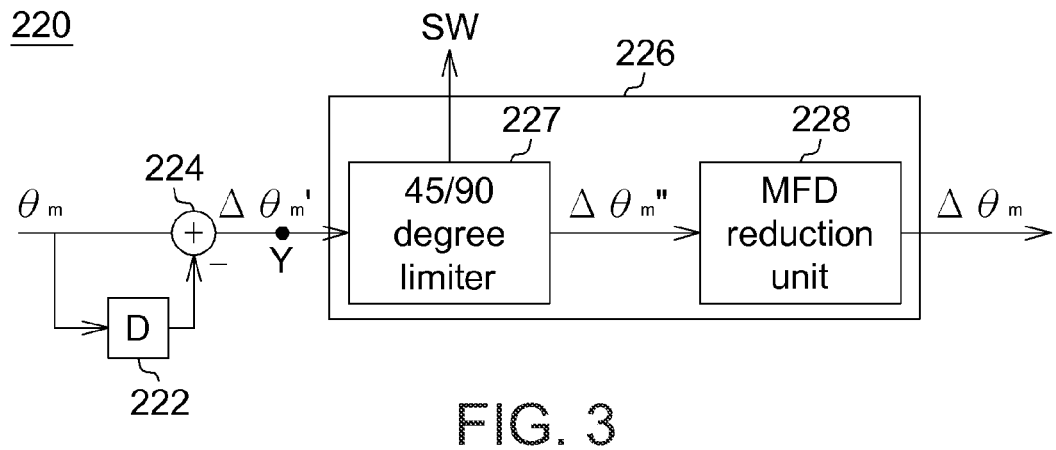
FIG. 3 shows a functional block diagram of a phase/frequency signal processing circuit, which utilizes the invented phase swapping and phase/frequency deviation reduction procedure for transforming the phase information into frequency and reducing the frequency deviation, according to an embodiment.

Referring to FIG. 3, a functional block diagram of a phase/frequency signal processing circuit, which utilizes the invented phase swapping and phase/frequency deviation reduction procedure for transforming the phase information into frequency and reducing the frequency deviation, according to an embodiment is shown. The phase/frequency signal processing circuit 220 includes a delay unit 222, an adder 224, a phase/frequency deviation input Y and a controller 226. The adder 224 substantially acts as a subtractor. The delay unit 22 and the adder 224 process the phase component $\theta_m$, including multiple phase samples, to obtain multiple phase/frequency deviation samples $\Delta\theta_m'$ of N bits, and each of the phase/frequency deviation samples $\Delta\theta_m'$ is the difference between neighboring phase samples of the phase component $\theta_m$. The controller 226 includes a 45/90 degree limiter 227 and a maximum frequency deviation (MFD) reduction unit 228. For example, when only the first said technical feature is applied to the transmitter 200, the 45/90 degree limiter 227 is optional and can be omitted. The 45/90 degree limiter 227 generates an adjusted phase/frequency deviation signal, including multiple adjusted phase/frequency deviation samples $\Delta\theta_m''$, and the phase selection signal SW according to the phase/frequency deviation samples $\Delta\theta_m'$; the MFD reduction unit 228 processes the adjusted phase/frequency deviation signal and then outputs the modified phase/frequency deviation signal $\Delta\theta_m$, and generates a phase/frequency deviation carry-out signal in response to multiple adjusted phase/frequency deviation samples $\Delta\theta_m''$ of the adjusted phase/frequency deviation signal and a previous time sample of the phase/frequency deviation carry-out signal. The ADPLL 230 is located on a frequency modulating path and performs frequency modulation in response to the modified phase/frequency deviation signal $\Delta\theta_m$, and outputs the frequency modulated carrier signal F, which consists of one, two or multiple phases, such as 4 phases. The phase swapper 234 selects one of the phases in response to the phase selection signal SW for forming the frequency modulated carrier signal F. When the transmitter 200 only applies the first said technical feature and the phase swapper 234 is removed or inactivated, only one or two phases of the DCO are used.

Figure 4A:
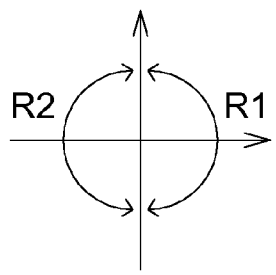
FIG. 4A shows a phase swapping illustration of a 90 degree limiter according to an embodiment.

Assume that the 45/90 degree limiter 227 in FIG. 3 is a 90 degree limiter, a first predetermined threshold is defined as $\pi/2$. Referring to FIG. 4A, a phase swapping illustration of a 90 degree limiter according to an embodiment is shown. When the phase/frequency deviation sample $\Delta\theta_m'$ locates in a first phase range R1 and does not exceed the first predetermined threshold $\pi/2$, the corresponding adjusted phase/frequency deviation sample $\Delta\theta_m''$ is equal to $\Delta\theta_m'$; that is, when $|\Delta\theta_m'| \leq \pi/2$, then $\Delta\theta_m'' = \Delta\theta_m'$. When the phase/frequency deviation sample $\Delta\theta_m'$ locates in a second phase range R2 and exceeds the first predetermined threshold $\pi/2$, the corresponding adjusted phase/frequency deviation sample $\Delta\theta_m''$ is equal to $\Delta\theta_m' - \pi$; that is, when $|\Delta\theta_m'| \leq \pi/2$, then $\Delta\theta_m'' = \Delta\theta_m' - \pi$. Each of the adjusted phase/frequency deviation samples does not exceed the first predetermined threshold $\pi/2$. Consequently, bandwidth of the adjusted phase/frequency deviation signal is limited to $\pi/2$ and is substantially narrower than bandwidth of the phase/frequency deviation samples $\Delta\theta_m'$. In addition, when the phase/frequency deviation sample $\Delta\theta_m'$ exceeds the first predetermined threshold $\pi/2$, the phase selection signal SW is changed with respect to its previous value and causes the phase swapper 234 to select the phase, such as I+, Q+, I− or Q− shown in FIG. 2, corresponding to the value of the changed phase selection signal. Note that the terms phase and frequency are used interchangeably here for $\Delta\theta_m'$, $\Delta\theta_m''$ and $\Delta\theta_m$ because the sampling rate $f_s$ is fixed and their fixed relationship is valid: $\Delta f = \Delta\theta_m/2\pi \cdot f_s$. The terms $\Delta f$ is in the units of hertz, whereas $\Delta\theta_m$ is in the units of radians.

Figure 4B:
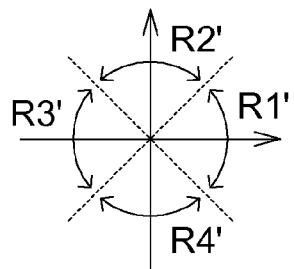
FIG. 4B shows a phase swapping illustration of a 45 degree limiter according to an embodiment.

Assume that the 45/90 degree limiter 227 in FIG. 3 is a 90 degree limiter, a first predetermined threshold is defined as $\pi/4$. Referring to FIG. 4B, a phase swapping illustration of a 45 degree limiter according to an embodiment is shown. When the phase/frequency deviation sample $\Delta\theta_m'$ locates in a first phase range R1' and does not exceed the first predetermined threshold $\pi/4$, the corresponding adjusted phase/frequency deviation sample $\Delta\theta_m''$ is equal to $\Delta\theta_m'$; that is, when $|\Delta\theta_m'| \leq \pi/4$, then $\Delta\theta_m'' = \Delta\theta_m'$. When the phase/frequency deviation sample $\Delta\theta_m'$ locates in a second phase range R2' and exceeds the first predetermined threshold $\pi/4$, the corresponding adjusted phase/frequency deviation sample $\Delta\theta_m''$ is equal to $\Delta\theta_m' - \pi/2$; that is, when $\pi/4 < \Delta\theta m' \leq 3\pi/4$, then $\Delta\theta m' - \pi/2$. When the phase/frequency deviation sample $\Delta\theta_m'$ locates in a third phase range R3' and exceeds the first predetermined threshold $\pi/4$, the corresponding adjusted phase/frequency deviation sample $\Delta\theta_m''$ is equal to $\Delta\theta_m' - \pi$; that is, when $3\pi/4 < \Delta\theta m' \leq 5\pi/4$, then $\Delta\theta_m'' = \Delta\theta_m' - \pi$. When the phase/frequency deviation sample $\Delta\theta_m'$ locates in a fourth phase range R4' and exceeds the first predetermined threshold $\pi/4$, the corresponding adjusted phase/frequency deviation sample $\Delta\theta_m''$ is equal to $\Delta\theta_m' + \pi/2$; that is, when $-3\pi/4 < \Delta\theta m' \leq -\pi/4$, then $\Delta\theta_m'' = \Delta\theta_m' + \pi/2$. Each of the adjusted phase/frequency deviation samples does not exceed the first predetermined threshold $\pi/4$. Consequently, bandwidth or peak phase/frequency deviation of the adjusted phase/frequency deviation signal is limited to $\pi/4$ and is substantially narrower than bandwidth or peak phase/frequency deviation of the phase/frequency deviation samples $\Delta\theta_m'$. In addition, when the phase/frequency deviation sample $\Delta\theta_m'$ exceeds the first predetermined threshold $\pi/4$, the phase selection signal SW is changed with respect to its previous value and causes the phase swapper 234 to select the phase, such as I+, Q+, I− or Q− shown in FIG. 2, corresponding to the value of the changed phase selection signal.

Figure 5:
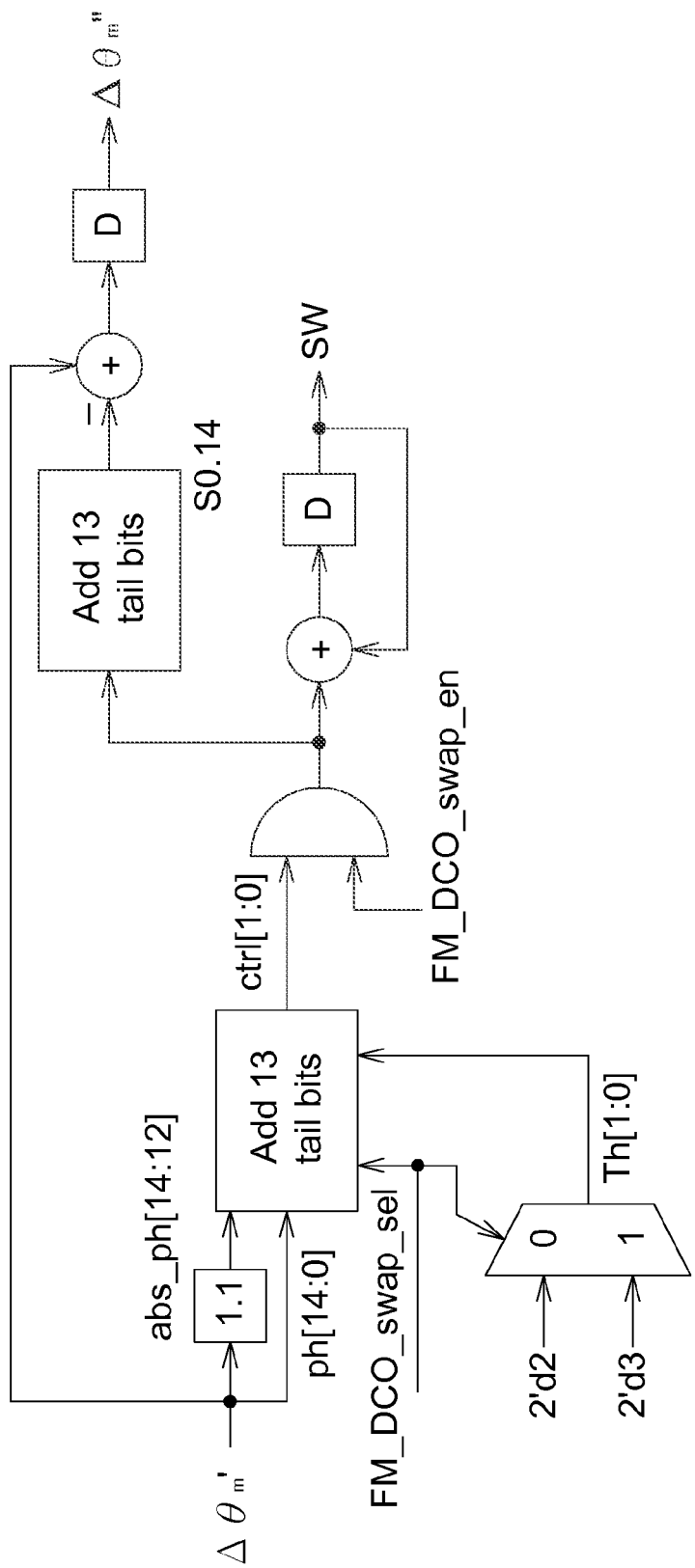
FIG. 5 shows a practical circuit diagram of a 45/90 degree limiter according to an embodiment.

As being processed by the 45/90 degree limiter 227, the bandwidth or peak phase/frequency deviation of the adjusted phase/frequency deviation signal is limited to the first predetermined threshold. One embodiment of a practical circuit of the 45/90 degree limiter 227 is shown in FIG. 5, but it is not limited thereto. In addition, due to the phase selection signal SW is changed with respect to its previous value and causes the phase swapper 234 to select the phase corresponding to the value of the changed phase selection signal, the input of the ADPLL 230 with respect to the output of the ADPLL 230 shows a specific pattern.

Figure 6A:
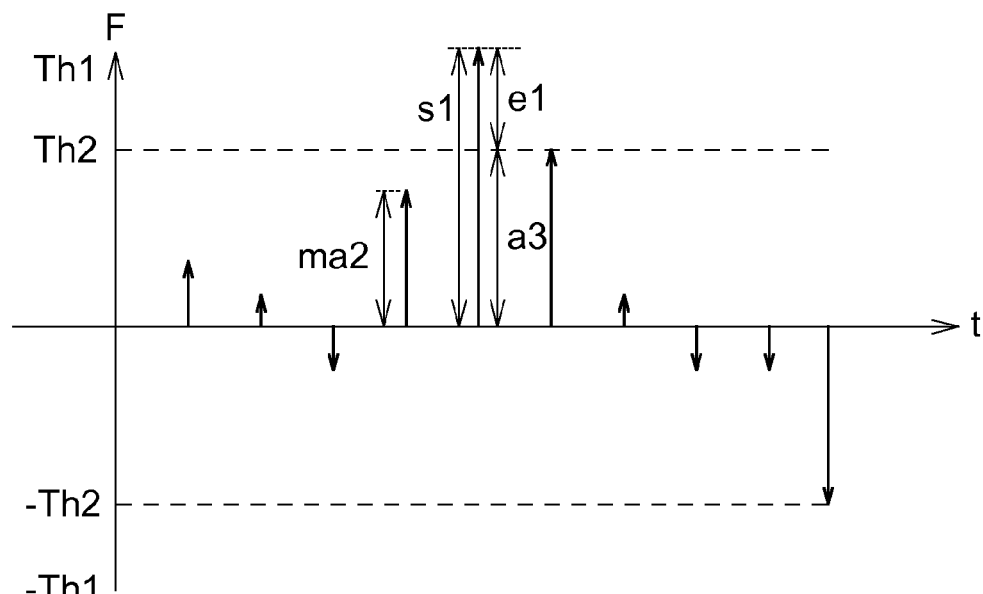
FIGS. 6A to 6D show timing diagram illustrations of a phase/frequency deviation reduction procedure of a maximum frequency deviation (MFD) reduction unit according to an embodiment.

After processing the adjusted phase/frequency deviation signal, the MFD reduction unit 228 of the controller 226 outputs the modified phase/frequency deviation signal $\Delta\theta_m$ and generates a phase/frequency deviation carry-out signal in response to multiple adjusted phase/frequency deviation samples $\Delta\theta_m''$ of the adjusted phase/frequency deviation signal and a previous time sample of the phase/frequency deviation carry-out signal. Referring to FIGS. 6A to 6D, schematic illustrations of a phase/frequency deviation reduction procedure of a MFD reduction unit according to an embodiment are shown. The phase/frequency deviation reduction procedure is iterative. In FIG. 6A, the MFD reduction unit 228 calculates an average, a typical value as a sum is used in FIG. 6A since it is easier to calculate, of the previous time sample and a current changed phase/frequency deviation sample to obtain a sample s1. The MFD reduction unit 228 detects whether the sample s1 exceeds a second predetermined threshold Th2 to determine a first excess e1 by which the sample s1 exceeds the second determined threshold Th2.

Figure 6B:
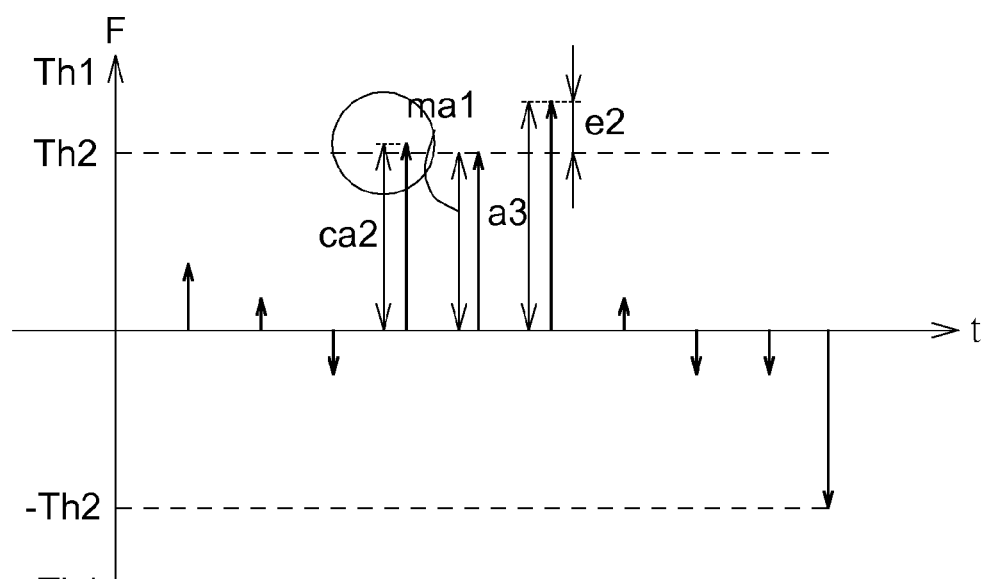

In FIG. 6B, the MFD reduction unit 228 subtracts the first excess e1 from the sample s1 to obtain a current modified phase/frequency deviation sample ma1, and distributes the first excess e1 to a previous modified phase/frequency deviation sample ma2 and a next phase/frequency deviation sample a3. Take the first excess e1 is distributed equally as being exemplified, the MFD reduction unit 228 distributes the first excess e1 to the previous modified phase/frequency deviation sample ma2 and the next phase/frequency deviation sample a3 to obtain a previous intermediate sample ca2, equal to (ma2+e1/2), and a next intermediate sample ca3, equal to (a3+e1/2). In FIG. 6B, the MFD reduction unit 228 detects whether the next intermediate sample ca3 exceeds the second predetermined threshold Th2 to determine a second excess e2 by which the next intermediate sample ca3 exceeds the second predetermined threshold Th2.

Figure 6C:
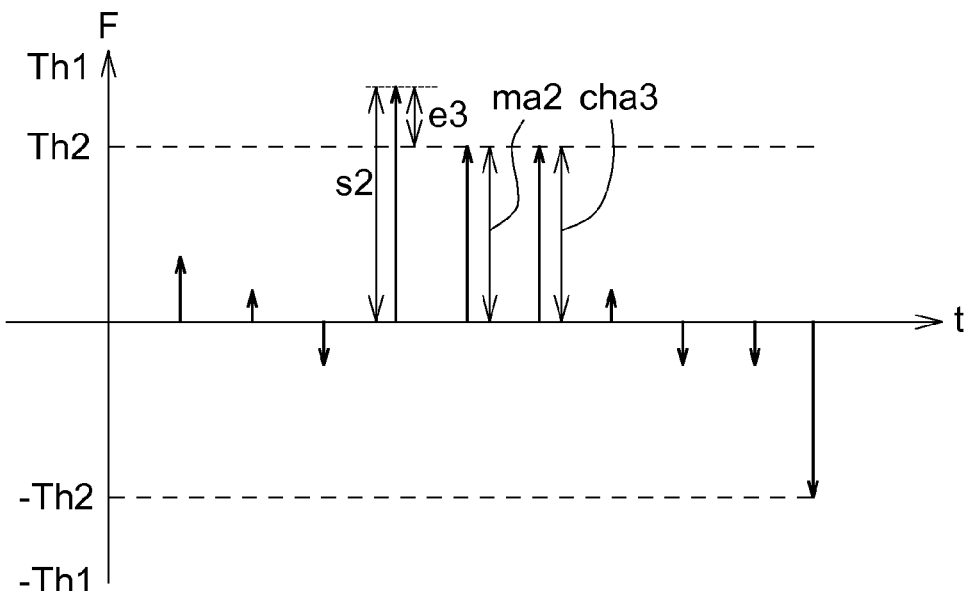
Figure 6D:
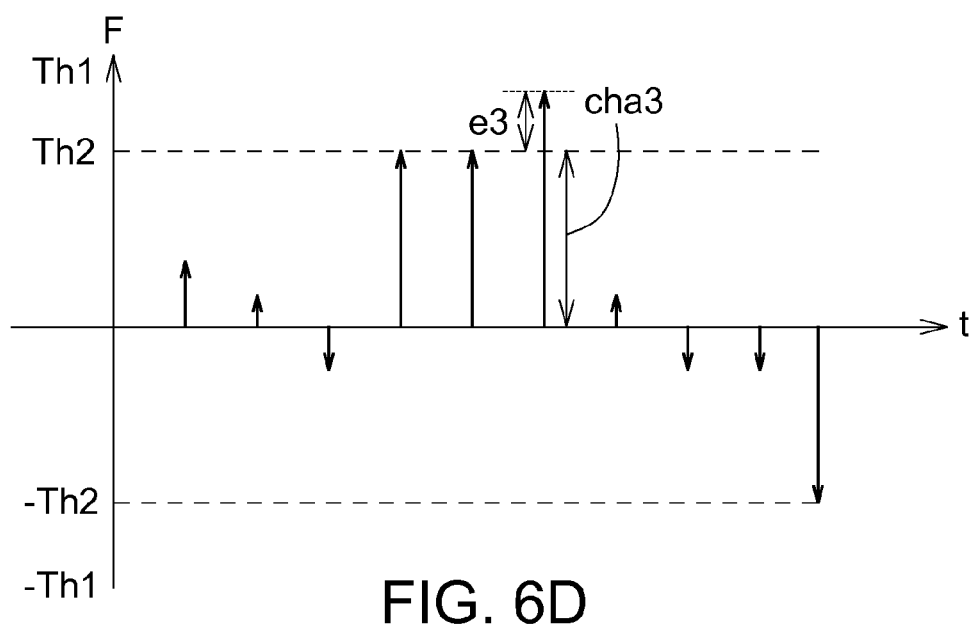

In FIG. 6C, the MFD reduction unit 228 subtracts the second excess e2 from the next intermediate sample ca3 to obtain a next changed phase/frequency deviation sample cha3. The MFD reduction unit 228 calculates an average, a typical value as a sum is used in FIG. 6C, of the second excess e2 and the previous intermediate sample ca2 to obtain a sample S2, equal to (e2+ca2). The MFD reduction unit 228 detects whether the sample S2 exceeds the second predetermined threshold Th2 to determine a third excess e3 by which the sample S2 exceeds the second determined threshold The2. In FIG. 6D, the MFD reduction unit 228 subtracts the third excess e3 from the sample S2, and the third excess e3 is outputted as a component of the phase/frequency deviation carry-out signal through the frequency modulating path.

Moreover, the third excess e3 is substantially a previous time sample of the next changed phase/frequency deviation sample cha3. Afterwards, the MFD reduction unit 228 iteratively repeats the procedure in FIGS. 6A to 6D, and proceeds to calculate an average of the third excess e3 and the next changed phase/frequency deviation sample cha3.

Figure 7:
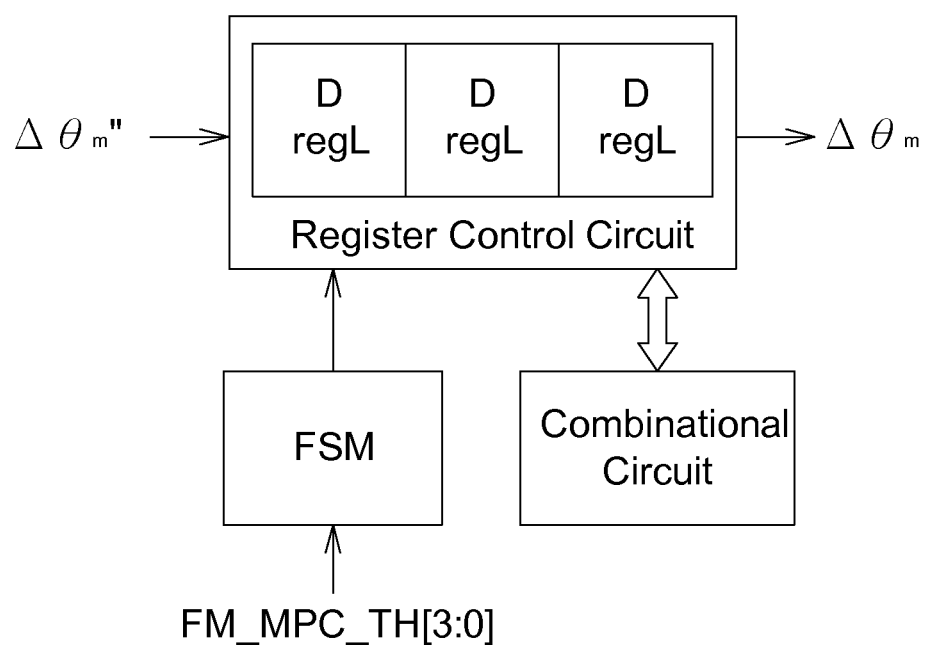
FIG. 7 shows a practical circuit diagram of a maximum frequency deviation (MFD) reduction unit, including three registers to store three adjacent phase/frequency deviation samples which are processed by a finite state machine (FSM) to achieve the reduction of the MFD and keep FM signal quality, according to an embodiment.

Amplitudes of the phase/frequency deviation samples practically processed by the MFD reduction unit 228 are usually small, hence it only has to keep the total phases at the neighboring time spots constant. Therefore, as being processed by the MFD reduction unit 228, the accesses are distributed to the neighboring phase/frequency deviation samples, so that the modified phase/frequency deviation signal F includes multiple modified phase/frequency deviation samples corresponding to the phase/frequency deviation samples $\Delta\theta_m'$, and each of the modified phase/frequency deviation samples does not exceed the second predetermined threshold Th2. One embodiment of a practical circuit of the MFD reduction unit 228, including three registers to store three adjacent phase/frequency deviation samples which are processed by a finite state machine (FSM) to achieve the reduction of the MFD and keep FM signal quality, is shown in FIG. 7, but it is not limited thereto. The iterations shown in FIGS. 6A to 6D are processed by the FSM. The combinational circuit executes the adder and subtractive operations according to the control signal from FSM and re-stores back to the register and updates the phase/frequency deviation information to the reduced and compensated ones.

The transmitter and frequency deviation reduction method thereof proposed in the disclosure limit a phase variation of an input signal to a specific range. The wider the bandwidth of the transmitter, the larger the frequency deviation. As the bandwidth is wider, the data rate is higher and closer to 180 degree, thus the design of the DCO is more complexity. Therefore, the technical feature "limiting a phase variation to a specific range" of the disclosure can improve the peak frequency phenomenon at the input of the ADPLL, reduce the complexity of the ADPLL and keep the linearity of the ADPLL, thus improving overall performance of the transmitter.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transmitter, comprising:
   a phase/frequency deviation input for receiving a plurality of phase/frequency deviation samples;
   a controller for outputting a modified phase/frequency deviation signal and generating a phase/frequency deviation carry-out signal in response to the phase/frequency deviation samples and a previous time sample of the phase/frequency deviation carry-out signal; and
   a frequency modulating path for performing frequency modulation in response to the modified phase/frequency deviation signal and outputting a frequency modulated carrier signal.

2. The transmitter according to claim 1, wherein the controller subtracts a first excess from an average of the previous time sample and a current changed phase/frequency deviation sample to obtain a current modified phase/frequency deviation sample, and distributes the first excess to a previous modified phase/frequency deviation sample and a next phase/frequency deviation sample.

3. The transmitter according to claim 2, wherein said previous modified phase/frequency deviation sample is made causal through a time delay.

4. The transmitter according to claim 2, wherein the controller distributes the first excess to the previous modified phase/frequency deviation sample and the next phase/frequency deviation sample to obtain a previous intermediate sample and a next intermediate sample, subtracts a second excess from the next intermediate sample to obtain a next changed phase/frequency deviation sample, and subtracts a third excess from an average of the second excess and the previous intermediate sample.

5. The transmitter according to claim 4, wherein the third excess is outputted as the phase/frequency deviation carry-out signal.

6. The transmitter according to claim 1, further comprises:
   an amplitude modulating path for performing amplitude modulation on the frequency modulated carrier signal.

7. The transmitter according to claim 6, wherein the controller is further responsive to an amplitude modulating signal from the amplitude modulating path.

8. The transmitter according to claim 1, wherein the modified phase/frequency deviation signal includes a plurality of modified phase/frequency deviation samples corresponding to the phase/frequency deviation samples, and each of the modified phase/frequency deviation samples does not exceed a predetermined threshold.

9. The transmitter according to claim 8, wherein bandwidth of the modified phase/frequency deviation signal is substantially narrower than bandwidth of the phase/frequency deviation samples.

10. A method of frequency deviation reduction in a transmitter, the method comprising:
    utilizing a phase/frequency deviation input to receive a plurality of phase/frequency deviation samples;
    utilizing a controller to output a modified phase/frequency deviation signal and generate a phase/frequency deviation carry-out signal in response to the phase/frequency deviation samples and a previous time sample of the phase/frequency deviation carry-out signal; and
    utilizing a frequency modulating path to perform frequency modulation in response to the modified phase/frequency deviation signal and output a frequency modulated carrier signal.

11. The method of frequency deviation reduction in a transmitter according to claim 10, further comprising:
    utilizing the controller to calculate an average of the previous time sample and a current changed phase/frequency deviation sample, detect whether the average exceeds a predetermined threshold to determine a first excess by which the average exceeds the determined threshold, and subtract the first excess from the average to obtain a current modified phase/frequency deviation sample; and
    utilizing the controller to distribute the first excess to a previous modified phase/frequency deviation sample and a next phase/frequency deviation sample.

12. The method of frequency deviation reduction in a transmitter according to claim 10, further comprising:
    making said previous modified phase/frequency deviation sample casual through a time delay.

13. The method of frequency deviation reduction in a transmitter according to claim 11, further comprising:

utilizing the controller to distribute the first excess to the previous modified phase/frequency deviation sample and the next phase/frequency deviation sample to obtain a previous intermediate sample and a next intermediate sample;

utilizing the controller to detect whether the next intermediate sample exceeds the predetermined threshold to determine a second excess by which the next intermediate sample exceeds the predetermined threshold, and subtract the second excess from the next intermediate sample to obtain a next changed phase/frequency deviation sample; and utilizing the controller to calculate an average of the second excess and the previous intermediate sample, detect whether the average exceeds the predetermined threshold to determine a third excess by which the average exceeds the determined threshold, and subtract the third excess from the average.

14. The method of frequency deviation reduction in a transmitter according to claim 13, further comprising:
utilizing the frequency modulating path to output the third excess as the phase/frequency deviation carry-out signal.

15. The method of frequency deviation reduction in a transmitter according to claim 10, further comprising:
utilizing an amplitude modulating path to perform amplitude modulation on the frequency modulated carrier signal.

16. The method of frequency deviation reduction in a transmitter according to claim 15, wherein the utilizing the controller step is further responsive to an amplitude modulating signal from the amplitude modulating path.

17. The method of frequency deviation reduction in a transmitter according to claim 10, wherein the modified phase/frequency deviation signal includes a plurality of modified phase/frequency deviation samples corresponding to the phase/frequency deviation samples, and each of the modified phase/frequency deviation samples does not exceed a predetermined threshold.

18. The method of frequency deviation reduction in a transmitter according to claim 17, wherein bandwidth of the modified phase/frequency deviation signal is substantially narrower than bandwidth of the phase/frequency deviation samples.

19. A transmitter, comprising:
a phase/frequency deviation input for receiving a plurality of phase/frequency deviation samples;
a controller for generating an adjusted phase/frequency deviation signal and a phase selection signal according to the phase/frequency deviation samples;
a frequency modulating path for performing frequency modulation in response to the adjusted phase/frequency deviation signal and outputting a frequency modulated carrier signal consisting of a plurality of phases; and
a phase swapper for selecting one of the phases in response to the phase selection signal for forming the frequency modulated carrier signal.

20. The transmitter according to claim 19, wherein the adjusted phase/frequency deviation signal includes a plurality of adjusted phase/frequency deviation samples corresponding to the phase/frequency deviation samples, and each of the adjusted phase/frequency deviation samples does not exceed a predetermined threshold.

21. The transmitter according to claim 20, wherein bandwidth of the adjusted phase/frequency deviation signal is substantially narrower than bandwidth of the phase/frequency deviation samples.

22. The transmitter according to claim 20, wherein when the phase/frequency deviation sample exceeds the predetermined threshold, the phase selection signal is changed with respect to its previous value and causes the phase swapper to select the phase corresponding to the value of the changed phase selection signal.

23. The transmitter according to claim 19, wherein the frequency modulated carrier signal consists of four phases.

24. A method of frequency deviation reduction in a transmitter, the method comprising:
utilizing a phase/frequency deviation input to receive a plurality of phase/frequency deviation samples;
utilizing a controller to generate an adjusted phase/frequency deviation signal and a phase selection signal according to the phase/frequency deviation samples;
utilizing a frequency modulating path to perform frequency modulation in response to the adjusted phase/frequency deviation signal and output a frequency modulated carrier signal consisting of a plurality of phases; and
utilizing a phase swapper to select one of the phases in response to the phase selection signal for forming the frequency modulated carrier signal.

25. The method of frequency deviation reduction in a transmitter according to claim 24, further comprising:
utilizing the controller to detect whether the phase/frequency deviation sample exceeds a predetermined threshold;
utilizing the controller to determine a residue amount by which the phase/frequency deviation sample exceeds the predetermined threshold and accordingly change the phase selection signal with respect to its previous value; and
utilizing the phase swapper to select the phase corresponding to the value of the changed phase selection signal.

26. The method of frequency deviation reduction in a transmitter according to claim 24, wherein the adjusted phase/frequency deviation signal includes a plurality of adjusted phase/frequency deviation samples corresponding to the phase/frequency deviation samples, and each of the adjusted phase/frequency deviation samples does not exceed a predetermined threshold.

27. The method of frequency deviation reduction in a transmitter according to claim 26, wherein bandwidth of the adjusted phase/frequency deviation signal is substantially narrower than bandwidth of the phase/frequency deviation samples.

28. The method of frequency deviation reduction in a transmitter according to claim 24, wherein the frequency modulated carrier signal consists of four phases.

29. A transmitter, comprising:
a phase/frequency deviation input for receiving a plurality of phase/frequency deviation samples;
a controller for generating an adjusted phase/frequency deviation signal and a phase selection signal according to the phase/frequency deviation samples, and for outputting a modified phase/frequency deviation signal and generating a phase/frequency deviation carry-out signal in response to a plurality of adjusted phase/frequency deviation samples of the adjusted phase/frequency deviation signal and a previous time sample of the phase/frequency deviation carry-out signal;
a frequency modulating path for performing frequency modulation in response to the modified phase/frequency deviation signal and outputting a frequency modulated carrier signal consisting of a plurality of phases; and a phase swapper for selecting one of the phases in response to the phase selection signal for forming the frequency modulated carrier signal.

30. The transmitter according to claim 29, wherein bandwidth of the modified phase/frequency deviation signal is substantially narrower than bandwidth of the phase/frequency deviation samples.

31. The transmitter according to claim 29, wherein the adjusted phase/frequency deviation samples correspond to the phase/frequency deviation samples, and each of the adjusted phase/frequency deviation samples does not exceed a first predetermined threshold.

32. The transmitter according to claim 31, wherein when the phase/frequency deviation sample exceeds the first predetermined threshold, the phase selection signal is changed with respect to its previous value and causes the phase swapper to select the phase corresponding to the value of the changed phase selection signal.

33. The transmitter according to claim 29, wherein the frequency modulated carrier signal consists of four phases.

34. The transmitter according to claim 29, wherein the controller subtracts a first excess from an average of the previous time sample and a current changed phase/frequency deviation sample to obtain a current modified phase/frequency deviation sample, and distributes the first excess to a previous modified phase/frequency deviation sample and a next phase/frequency deviation sample.

35. The transmitter according to claim 34, wherein the controller distributes the first excess to the previous modified phase/frequency deviation sample and the next phase/frequency deviation sample to obtain a previous intermediate sample and a next intermediate sample, subtracts a second excess from the next intermediate sample to obtain a next changed phase/frequency deviation sample, and subtracts a third excess from an average of the second excess and the previous intermediate sample.

36. The transmitter according to claim 35, wherein the third excess is outputted as the phase/frequency deviation carry-out signal.

37. The transmitter according to claim 29, further comprises:
an amplitude modulating path for performing amplitude modulation on the frequency modulated carrier signal.

38. The transmitter according to claim 37, wherein the controller is further responsive to an amplitude modulating signal from the amplitude modulating path.

39. The transmitter according to claim 29, wherein the modified phase/frequency deviation signal includes a plurality of modified phase/frequency deviation samples corresponding to the phase/frequency deviation samples, and each of the modified phase/frequency deviation samples does not exceed a second predetermined threshold.

40. A method of frequency deviation reduction in a transmitter, the method comprising:
utilizing a phase/frequency deviation input to receive a plurality of phase/frequency deviation samples;
utilizing a controller to generate an adjusted phase/frequency deviation signal and a phase selection signal according to the phase/frequency deviation samples, and to output a modified phase/frequency deviation signal and generate a phase/frequency deviation carry-out signal in response to a plurality of adjusted phase/frequency deviation samples of the adjusted phase/frequency deviation signal and a previous time sample of the phase/frequency deviation carry-out signal;
utilizing a frequency modulating path to perform frequency modulation in response to the modified phase/frequency deviation signal and output a frequency modulated carrier signal; and
utilizing a phase swapper to select one of the phases in response to the phase selection signal for forming the frequency modulated carrier signal.

41. The method of frequency deviation reduction in a transmitter according to claim 40, wherein bandwidth of the modified phase/frequency deviation signal is substantially narrower than bandwidth of the phase/frequency deviation samples.

42. The method of frequency deviation reduction in a transmitter according to claim 40, wherein the adjusted phase/frequency deviation samples correspond to the phase/frequency deviation samples, and each of the adjusted phase/frequency deviation samples does not exceed a first predetermined threshold.

43. The method of frequency deviation reduction in a transmitter according to claim 42, wherein when the phase/frequency deviation sample exceeds the first predetermined threshold, the phase selection signal is changed with respect to its previous value and causes the phase swapper to select the phase corresponding to the value of the changed phase selection signal.

44. The method of frequency deviation reduction in a transmitter according to claim 40, wherein the frequency modulated carrier signal consists of four phases.

45. The method of frequency deviation reduction in a transmitter according to claim 40, further comprising:
utilizing the controller to calculate an average of the previous time sample and a current changed phase/frequency deviation sample, detect whether the average exceeds a second predetermined threshold to determine a first excess by which the average exceeds the second determined threshold, and subtract the first excess from the average to obtain a current modified phase/frequency deviation sample; and
utilizing the controller to distribute the first excess to a previous modified phase/frequency deviation sample and a next phase/frequency deviation sample.

46. The method of frequency deviation reduction in a transmitter according to claim 45, further comprising:
utilizing the controller to distribute the first excess to the previous modified phase/frequency deviation sample and the next phase/frequency deviation sample to obtain a previous intermediate sample and a next intermediate sample;
utilizing the controller to detect whether the next intermediate sample exceeds the second predetermined threshold to determine a second excess by which the next intermediate sample exceeds the second predetermined threshold, and subtract the second excess from the next intermediate sample to obtain a next changed phase/frequency deviation sample; and
utilizing the controller to calculate an average of the second excess and the previous intermediate sample, detect whether the average exceeds the second predetermined threshold to determine a third excess by which the average exceeds the second determined threshold, and subtract the third excess from the average.

47. The method of frequency deviation reduction in a transmitter according to claim 45, further comprising:
utilizing the frequency modulating path to output the third excess as the phase/frequency deviation carry-out signal.

48. The method of frequency deviation reduction in a transmitter according to claim 40, further comprising:

utilizing an amplitude modulating path to perform amplitude modulation on the frequency modulated carrier signal.

49. The method of frequency deviation reduction in a transmitter according to claim 40, wherein the modified phase/frequency deviation signal includes a plurality of modified phase/frequency deviation samples corresponding to the phase/frequency deviation samples, and each of the modified phase/frequency deviation samples does not exceed a second predetermined threshold.

* * * * *